(12) United States Patent
Bacha

(10) Patent No.: US 10,579,459 B2
(45) Date of Patent: Mar. 3, 2020

(54) LOG EVENTS FOR ROOT CAUSE ERROR DIAGNOSIS

(71) Applicant: Hewlett Packard Enterprise Development LP, Houston, TX (US)

(72) Inventor: Anys Bacha, Dublin, OH (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 214 days.

(21) Appl. No.: 15/493,333

(22) Filed: Apr. 21, 2017

(65) Prior Publication Data
US 2018/0307551 A1  Oct. 25, 2018

(51) Int. Cl.
*G06F 11/07* (2006.01)
*G06N 20/00* (2019.01)
*G06N 3/04* (2006.01)
*G06N 3/08* (2006.01)

(52) U.S. Cl.
CPC ........ *G06F 11/079* (2013.01); *G06F 11/0709* (2013.01); *G06F 11/0751* (2013.01); *G06F 11/0766* (2013.01); *G06F 11/0778* (2013.01); *G06N 3/0445* (2013.01); *G06N 3/084* (2013.01); *G06N 20/00* (2019.01)

(58) Field of Classification Search
CPC .. G06F 11/1476; G06F 11/1417; G06F 11/20; G06F 11/079; G06F 11/3466; G06F 11/3476; G06F 11/0709; G06F 11/0751; G06F 11/0778; G06N 3/0445
USPC ................................. 714/26, 37, 3
See application file for complete search history.

(56) References Cited

U.S. PATENT DOCUMENTS

| 5,253,184 A * | 10/1993 | Kleinschnitz ............ G07C 3/00 702/184 |
| 5,463,768 A * | 10/1995 | Cuddihy .............. G06F 11/2205 714/37 |
| 9,443,192 B1 | 9/2016 | Cosic |
| 2003/0065409 A1 | 4/2003 | Raeth et al. |
| 2004/0073844 A1* | 4/2004 | Unkle ................ G05B 23/0229 714/39 |
| 2004/0221198 A1* | 11/2004 | Vecoven ............. G06F 11/0727 714/25 |

(Continued)

FOREIGN PATENT DOCUMENTS

GB  2514563 A  * 12/2014  .......... G06F 11/1471

OTHER PUBLICATIONS

Connor et al., "Recurrent Neural Networks and Robust Time Series Prediction", IEEE, vol. 5, No. 2, pp. 240-254 (Year: 1994).*

(Continued)

*Primary Examiner* — Matthew M Kim
*Assistant Examiner* — Indranil Chowdhury
(74) *Attorney, Agent, or Firm* — Hewlett Packard Enterprise Patent Department

(57) ABSTRACT

Examples disclosed herein relate to log events for root cause error diagnosis. A deep learning model including parameters that are trained to identify relevance of log event information to diagnose root cause errors associated with a computing device is used. In one example, log event information is received. The log event information is processed according to the deep learning model to determine, for each log event, whether to store the log event information in a buffer based on relevance of the log event information to diagnosis of root cause errors.

15 Claims, 2 Drawing Sheets

(56) References Cited

U.S. PATENT DOCUMENTS

| | | | |
|---|---|---|---|
| 2007/0143547 A1* | 6/2007 | Farmer | G06F 12/0862 |
| | | | 711/137 |
| 2015/0310862 A1 | 10/2015 | Dauphin et al. | |
| 2015/0363688 A1 | 12/2015 | Gao et al. | |
| 2016/0373476 A1 | 12/2016 | Dell'anno et al. | |
| 2018/0197574 A1* | 7/2018 | Guo | G06N 3/08 |

OTHER PUBLICATIONS

Ye et al., "Board-Level Functional Fault Diagnosis Using Artificial Neural Networks, Support-Vector Machines, and Weighted-Majority Voting", IEEE, vol. 32, No. 5, pp. 723-736 (Year: 2013).*
Yao, C. et al., "Adaptive Logging: Optimizing Logging and Recovery Costs in Distributed In-Memory Databases", Proceedings of the 2016 International Conference on Management of Data, Jul. 1, 2016, pp. 1119-1134.

* cited by examiner

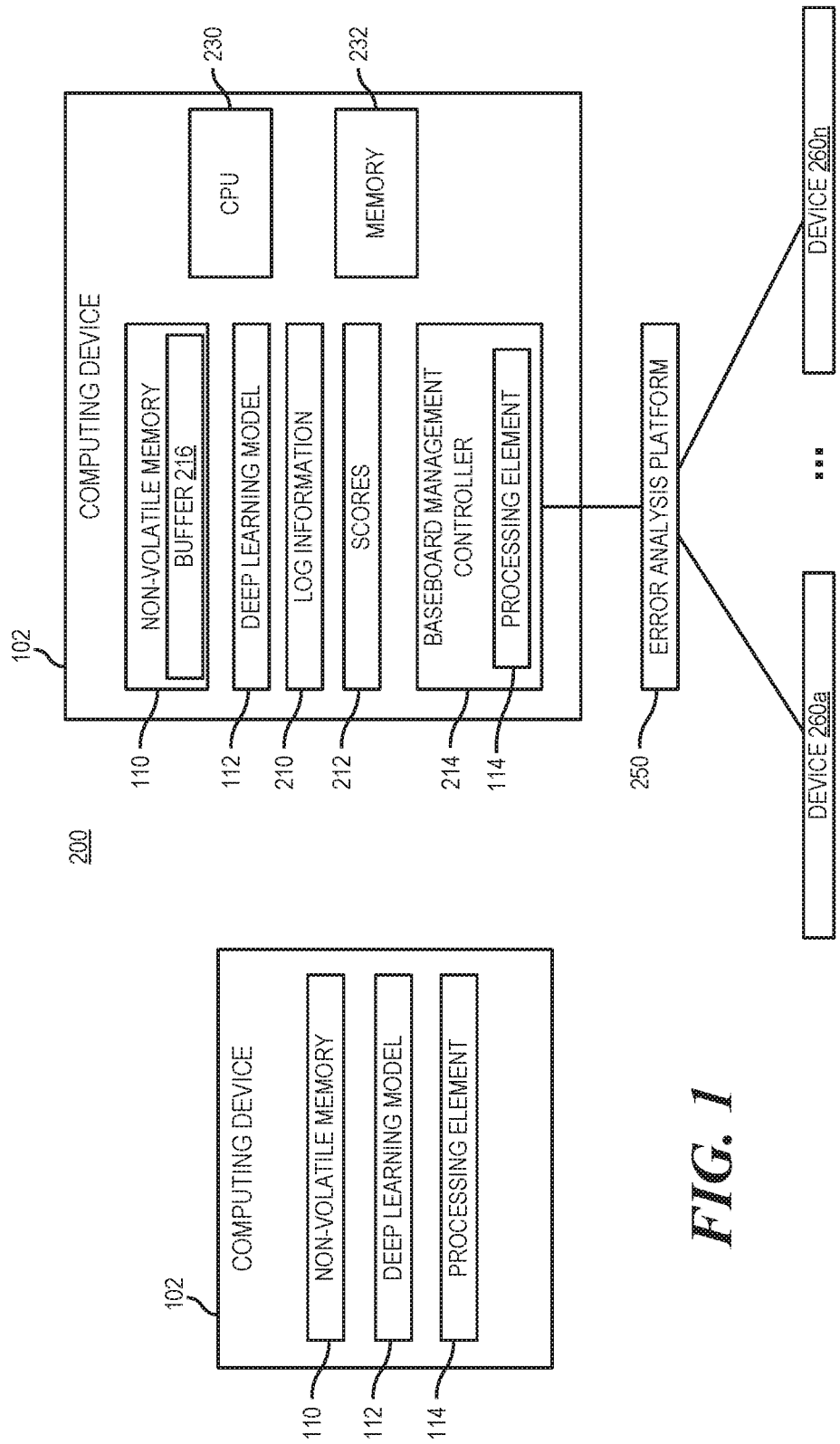

US 10,579,459 B2

LOG EVENTS FOR ROOT CAUSE ERROR DIAGNOSIS

BACKGROUND

Information Technology companies and manufacturers are challenged to deliver quality and value to consumers, for example by providing computing devices with high availability or ensure that devices are rapidly brought back online when a failure occurs. High availability is a characteristic that aims to ensure a level of operational performance, such as uptime for a period higher than a system that does not have the high availability characteristic. However, some computing devices with the high availability characteristic do become unavailable.

BRIEF DESCRIPTION OF THE DRAWINGS

The following detailed description references the drawings, wherein:

FIG. 1 is a block diagram of a computing device capable to process log event information according to a deep learning model to determine whether to store log event information in a buffer, according to an example;

FIG. 2 is a block diagram of a system including a computing device including a baseboard management controller capable to process log event information according to a deep learning model to determine whether to store log event information in a buffer, according to an example;

Figure 3:
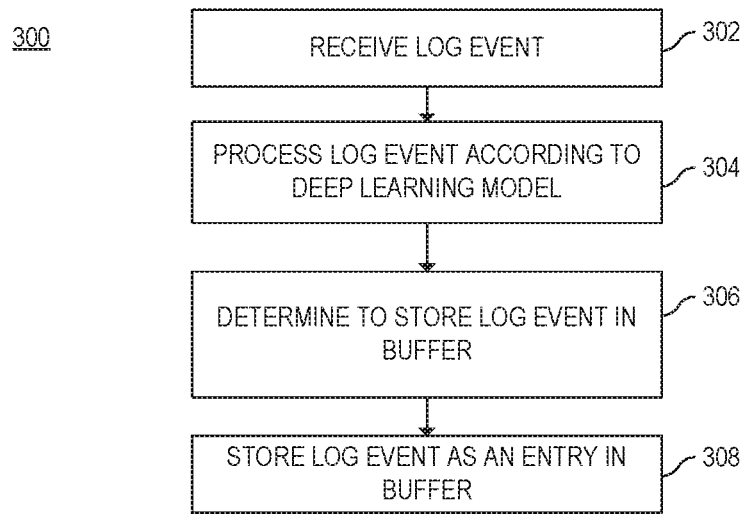
FIG. 3 is a flowchart of a method for storing a log event as an entry in a buffer based on processing the log event through a deep learning model, according to an example.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Information Technology (IT) companies and manufacturers are challenged to deliver quality and value to consumers, for example by providing computing devices with high availability or ensure that devices are rapidly brought back online when a failure occurs. With today's businesses demanding near real-time analytics on big data in order to conduct their daily transactions, IT companies are constantly being challenged to produce highly complex, yet fault tolerant systems to empower datacenters. As such, having the ability to efficiently diagnose failures of increasingly complex systems that generate a large number of events is advantageous.

Optimizing event logging to focus on preserving the right state information to diagnose failures can be beneficial. This type of optimization is also important for cost and power constrained Internet of Things (IoT) devices where storage space is generally scarce as well as in other areas, such as baseboard management controllers of servers.

A component to diagnosing failures involves the ability to preserve the right set of events. This is a challenging task when a limited amount of non-volatile storage is available. It is beneficial to store such events in a non-volatile storage so that the information is saved even if there is an issue with the system as a whole (e.g., power outage, corruption in memory causing an error, etc.).

System level failures are rarely confined to a single device (e.g., a field replaceable unit (FRU)) of a server. A failure in a device may often trigger side effects in the form of other component failures that lead to an undesired amount of unwanted events. Other failures manifest themselves as stuck-at faults that continuously log the same set of events. Such issues lead to inefficient usage of already limited log space (e.g. non-volatile memory) that can result in key events to be overwritten. Further, having a large number of unnecessary events has a downside of obfuscating the real source of a given failure and making it difficult to diagnose.

Another challenge with diagnosing failures relates to how software developers bind alert levels (severity) to events in a given system. Existing solutions rely on alert levels that are fixed at compile time. These pre-defined severities are often consumed by manageability systems for managing the available storage and in turn determining which events must be evicted. In other words, when the log space of a system becomes full, manageability can use the severity information to overwrite the lower priority events with the higher ones. However, this approach is not comprehensive since the severity of an event depends on its context. In other words, an event that has been labeled as low priority at compile time can be more important to root causing a given failure than higher priority events.

As such, a more accurate representation would be to optimize event logging during runtime as a function of its relevance in diagnosing failures. Accordingly, various examples disclosed herein relate to an approach that uses a deep learning to train which events are related diagnosis of root causes of error. Further, this approach can be used to determine which events should be prioritized and saved compared to others based on deep learning. The deep learning approach resolves the aforementioned issues by dynamically determining which events to log to storage as a function of past observations and the available buffer space. The approach can also ignore irrelevant events that unnecessarily fill up log space.

Accordingly, various examples provided herein use a deep learning architecture that can autonomously assist IT personnel and field engineers in determining faulty components that may need to be replaced by storing particular events in non-volatile memory. The examples include usage of Recurrent Neural Networks (RNN) for processing system events to determine what events are ultimately used to diagnose a root cause error. Prior logs can be used to train the deep learning network to be used in the field.

In one example, the computing system can include a server. A baseboard management controller (BMC) can be used to perform the analysis to determine what events to store for root cause analysis of errors. BMCs provide so-called "lights-out" functionality for computing devices. The lights out functionality may allow a user, such as a systems administrator to perform management operations on the computing device even if an operating system is not installed or not functional on the computing device. Moreover, in one example, the BMC can run on auxiliary power, thus the computing device need not be powered on to an on state where control of the computing device is handed over to an operating system after boot. As examples, the BMC may so-called provide management and so-called "out-of-band" services, such as remote console access, remote reboot and power management functionality, access to system logs, and the like. As used herein, a BMC has management capabilities for sub-systems of a computing device, and is separate from a processor that executes a main operating system of a computing device. The BMC may comprise an interface, such as a network interface, and/or serial interface that an administrator can use to remotely communicate with the BMC.

As noted, the BMC can have access to system logs. In one example, system components such as hardware device and/or software executing on top of hardware can be configured to provide event information to the BMC. The BMC can store the information in a buffer. In one example, the buffer can be stored in a non-volatile memory. In one example of a server implementation, when an error condition occurs on the computing device, the BMC can process system logs to determine a root cause for the error condition based on the deep learning approach. In some examples, the system logs can come from Field Replaceable Units (FRUs) or be related to the FRUs. As used herein, a field replaceable unit is a circuit board, part, or assembly that can be easily removed from a computing device and replaced by a user or technician without having to send the whole computing device to a repair facility. Examples of FRUs include parts that can attach to other parts of the computing device using a socket, a card, a module, etc. Further, examples of FRUs can include computing modules, memory modules, peripheral cards and devices, etc. In some examples, the system logs can include registers that provide particular information (e.g., an error flag for a particular component, a type of error, a current configuration, a location associated with an error, etc.).

Each event from a log can include an event identifier and event data. The event identifier can be considered a label that uniquely decodes a specific event. The event identifier and event data can be processed to determine relevance of an event for diagnosis purposes. This can be used to determine whether an event is relevant to diagnosis. In one example, if the event is relevant, it is included in the buffer. In some examples, the analysis can also include a measure of free space in the buffer. If there is free space, it can be more likely that an event is stored if it is relevant compared to when the buffer is full. Further, analysis can be performed such that a score is kept for the event as well as the events stored in the buffer. The scores can take into account staleness/an amount of time/incoming events. In one example, the scores can be taken into account for if/where the incoming event is stored in the buffer. For example, the event may replace another event with a lower priority score.

The approaches described herein provide a scalable approach across a wide range of platform types spanning complex enterprise servers and low cost IoT devices. The approaches can also reduce the overall cost of platforms by efficiently using non-volatile storage through intelligent logging. Moreover, the approaches can prevent important events that are useful to diagnosing failures from being overwritten. The described approaches can also filter out noisy events that can obfuscate the real source of a given failure. Moreover, the approaches described can eliminate the need for the traditional approach of using alert levels that are defined by developers at compile time. Instead, the solution determines the priority of events according to context information and obviates the need for alert levels.

Further, in some examples, the solution can generalize more efficiently to other platforms and architectures by using deep learning to approximate the mathematical function for performing efficient event logging. Thus, the approaches described herein can reduce the development costs associated with the classification of events with respect to alert levels. It also obviates the need for implementing complex eviction rules that are difficult to maintain for dealing with limited storage.

FIG. 1 is a block diagram of a computing device capable to process log event information according to a deep learning model to determine whether to store log event information in a buffer, according to an example. FIG. 2 is a block diagram of a system including a computing device including a baseboard management controller capable to process log event information according to a deep learning model to determine whether to store log event information in a buffer, according to an example.

In the example of FIG. 1, the computing device 102 includes a non-volatile memory 110, a deep learning model 112, and a processing element 114. In the example of FIG. 2, the computing device 102 can be included in a system 200 that can also include an error analysis platform 250 that can receive feedback from multiple devices. The error analysis platform 250 can take the feedback information to determine updates to parameters for a deep learning model 112 that is used to autonomously determine what events should be logged for diagnosis purposes.

When a log event is ready for analysis, the processing element 114 can identify the log event for analysis. In one example, the processing element 114 can be notified of the log event by another component (e.g., an operating system, a hardware device, etc.) of the computing device 102. In another example, one or multiple of the other components providing log events can provide the log events to a buffer that the processing element 114 processes. In some examples, an application programming interface can be used to provide the log events to the processing element 114. In one example, in the case of a BMC 214, the buffer can include a random access memory (RAM) in a memory 232 that the BMC 214 can access. As noted above, a BMC 214 can be capable of executing while the computing device 102 is powered to an auxiliary state. In an auxiliary state, a main operating system executing on a CPU 230 of the computing device 102 need not be executing. Log events can include security events, events associated with errors, events associated with a status or change in status of a device or component, events associated with health of a device or component, events associated with an operating system, events triggered by an interrupt, and the like.

In one example, the log event may include registers. In the example, each of the registers or other error log information can relate to particular information, for example, relate to a particular FRU, relate to particular components of the FRU, relate to particular errors or conditions of the FRU, relate to a condition of an operating system, relate to a condition of the computing device 102 as a whole, etc. The log event may identify the particular register or component as well. The processing element 114 can process log events according to a deep learning model 112.

Various deep learning models can be used. Examples of deep learning models include long short-term memory (LSTM), a convolution neural networks, recurrent neural networks, neural history compressor, recursive neural networks, gated recurrent unit (GRU), etc. An advantage to a recurrent neural network is the inclusion of feedback. The parameters used for the deep learning model 112 can be updated based on feedback from the computing device 102 or other devices 260 as discussed herein.

The deep learning model 112 can be applied to determine identify relevance of log event information to diagnose root cause errors associated with the computing device 102. As used herein, log event information can include an identifier of the log event and log event data.

The processing element 114 can process the log event information according to the deep learning model 112 to determine, for each log event, whether to store the log event in a buffer in non-volatile memory 110 based on relevance of the respective log event to diagnosis for root cause errors.

In one example model, the log events can be processed as characters. In the example model, characters can represent registers provided from FRU components or information associated with other systems logs. In one example, each character can be considered an input vector. A score for the event can be updated as each character is processed. Further, scores for other events stored in the buffer can be updated as well. During processing, these scores can be considered hidden. The updated scores can be included as an input vector along with the next character. The processing can continue until a character represents an end of the event.

In a Long Short Term Memory (LSTM) model, characters can be broken up by special characters and taken as a group (e.g., a group representing information associated with the event). For example, a first character may identify the event, a second, third, and fourth character may include log register information, and a special character (fifth character) may indicate that the information about the event is over. In this example, the five characters are meant to be processed together. Though a LSTM model is described, other approaches can be used, for example, a Gated Recurrent Unit. In some examples, the information processed for an event may also include a number of free entries in the buffer 216.

The input events can be sourced from any software entity, FRU, or the like. In one example, the Deep Neural Network (DNN) makes immediate predictions as it consumes input vectors. A fully connected architecture can be employed with the final stage being the output that predicts the entry to use for logging. In one example, the network is trained to output a value k where $k \in [-1, K]$ to indicate the entry number to be used. In the example, a value of −1 can be used to indicate that an event is irrelevant and should not be logged. Otherwise, an entry is allocated and the event is logged at entry k.

In some examples, the scores can be used to rank the probability that each of the event and the events currently stored in the buffer 216 are relevant to diagnose a root cause of an error. For example, a softmax function may be used to organize the scores (e.g., the softmax function can be used normalize the vectors into real values in the range of [0, 1] that add up to 1). In one example, an argmax or argmin function can be used to determine the entry that should not be included in the buffer 216 (e.g., because the score associated with the entry is least relevant to diagnosis of a root cause error). This selection can be the new event or an event already stored in the buffer. As such, a selected entry in the buffer 216 can be overwritten with the log event information. As noted, this can be based on a score of the log event and score information of the entries stored in the buffer 216. The processing element 114 can cause the selected entry to be overwritten by the log information.

Periodically or based on an event or request, the computing device 102 and/or other devices 260 can send score information to the error analysis platform 250. In one example, the score information can be sent as part of a completion of an error analysis. For example, a root cause of an error can be identified and error log information associated with diagnosing the root cause of the error can be provided to the error analysis platform 250.

The error analysis platform 250 can use the information as part of a new sample set to provide to the deep learning model to update parameters based on the real world experience of the computing device 102. The error analysis platform 250 can update the parameters for the deep learning model 116 for the computing device 102. The parameters can also be used in the other devices. The updated parameters can be sent by the error analysis platform 250 back to the devices that can use the updated parameters for future log processing.

The deep learning model can be trained on the error analysis platform 250 or another platform. The training may include initial error log impressions from a technical expert making the training sets based on error log entries (e.g., an error log entry of a register indicating that a memory module has an unrecoverable hard error may be trained to indicate that the memory module is a root cause for that error). Similarly, full systems configurations can be added to the sample sets as well.

For example, a configuration where a peripheral network card FRU has a hardware error, but two other FRUs (e.g., memory modules) have errors that were caused by the network card FRU, the root cause may be trained to be the network card (for that specific case) and parameters associated with that log condition can be identified as more relevant than in previous parameters. The training sets can be determined from observations. Feedback can come from computing devices put into implementation or from test units. As noted, the feedback can be used as training data to update the parameters for the deep learning model. Various approaches can be used to implement the deep learning approach to update parameters on the error analysis platform 250, for example, RMSprop, Adagrad, Adam, etc. In one example, gradient descent optimization algorithms can be used. In some examples, the computing devices used for training the parameters can be of a same model as the computing device 102. In some examples, a same model can be another computing device with at least a threshold number of core components that are the same (e.g., a system board, one or more supported processor types, etc.). In other examples, the deep learning model can account for multiple models of devices at a time.

In some examples, the updated parameters can be received by the processing element 114 from the error analysis platform 250 or an intermediary. As noted, the updated parameters may be based on feedback from at least one other computing device. In some examples, the other computing device can be of a same model as the computing device 102. In one example, being of the same model can mean that a main system component of both computing devices (e.g., a system board, an architecture, etc.) is the same between the two devices.

The deep learning parameters can be trained using a deep learning approach. The training can involve determination of a change to each parameter based on training information. Examples of such learning algorithms include gradient descent, various approaches used by Distbelief, Project Adam, and Hama, and stochastic gradient descent by backpropogation, among others.

A commonly used technique in distributed deep learning for both convolution neural network and recurrent neural network models is data parallelism. In this example, each worker (e.g., a central processing unit (CPU) or graphical processing unit (GPU)) receives a subset of a batch of training data. Each worker iteratively processes new training data from its subset of batches of the training data. The workers communicate by exchanging gradient updates. A parameter server is used to provide each of the workers the same model parameters. As such, in some examples, the error analysis platform can be implemented over a number of computing devices.

The following is an example model of distributed deep learning. In this example of distributed deep learning, each worker receives a subset of training data and a full set of model parameters for each iteration of training. At the beginning of one iteration, every worker sends a pull request to the parameter server and gets a latest copy of the parameters W, which might contain a number of floating-point values for a deep learning model. Each copy of the parameters on each device is called a model replica. Each model replica works on a different input training data subset. For example, each subset can contain log information including an identification of one or more log events that are considered relevant to root cause error diagnosis.

Each model replica calculates its data gradients (in an example with three workers $\Delta D1$, $\Delta D2$, $\Delta D3$) with its own mini-batch input and sends the gradients back (usually a push request) to the parameter server. The parameter server gathers the gradients from all the workers, calculates the average of the gradient, and updates the model accordingly. For example, a new W'can equal the previous W plus a learning rate times an average of the data gradients. Shown as an equation, the new W'can be expressed as $W'=W+$ learning rate*average ($\Delta D1$, $\Delta D2$, $\Delta D3$). In one example, the deep learning model 112 can be initially trained using predefined training data and then updated based on real world feedback.

A communication network can be used to communicatively couple the computing device with other computing devices and/or the error analysis platform. The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, devices communicate with each other and other components with access to communication networks via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

The BMC 214 can include hardware and/or combinations of hardware and programming to perform functions provided herein. As noted, the BMC 114 can provide so-called "lights-out" functionality for computing devices. The lights out functionality may allow a user, such as a systems administrator to perform management operations on the computing device even if an operating system is not installed or not functional on the computing device. Moreover, in one example, the BMC 214 can run on auxiliary power, thus the computing device need not be powered on to an on state where control of the computing device is handed over to an operating system after boot. As examples, the BMC 214 may so-called provide management and so-called "out-of-band" services, such as remote console access, remote reboot and power management functionality, access to system logs, and the like. As used herein, a BMC 214 has management capabilities for sub-systems of a computing device, and is separate from a processor that executes a main operating system of a computing device. The BMC 214 may comprise an interface, such as a network interface, and/or serial interface that an administrator can use to remotely communicate with the BMC 214.

In one example, a processor, such as a central processing unit (CPU) 230 or a microprocessor suitable for retrieval and execution of instructions and/or electronic circuits can be configured to perform the functionality for the computing device 102 separately from the BMC 214.

In some examples, the approaches used herein can relate to devices with network access, for example, IoT devices. In other examples, the devices can include full computers, servers, smart phones, etc.

Figure 4:
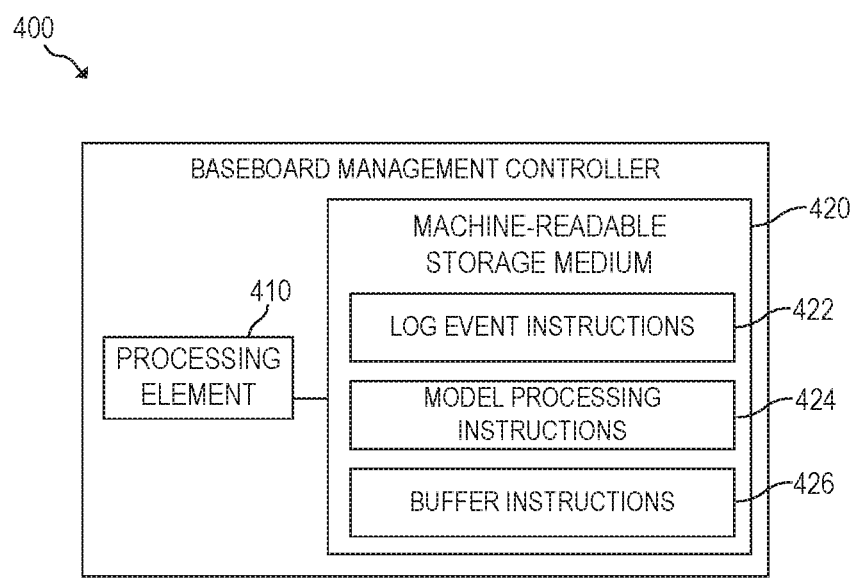
FIG. 4 is a block diagram of a baseboard management controller capable to store a log event as an entry in a buffer based on processing of the log event through a deep learning model, according to an example.

FIG. 3 is a flowchart of a method for storing a log event as an entry in a buffer based on processing the log event through a deep learning model, according to an example. FIG. 4 is a block diagram of a baseboard management controller capable to store a log event as an entry in a buffer based on processing of the log event through a deep learning model, according to an example. In one example, the BMC 400 can include a processing element 410 that is capable of executing log event instructions 422, model processing instructions 424, and buffer instructions 426 stored on a machine-readable storage medium 420 to implement method 300. Although execution of method 300 is described below with reference to BMC 400, other suitable components for execution of method 300 can be utilized (e.g., computing device 102). Method 300 may be implemented in the form of executable instructions stored on a machine-readable storage medium, such as storage medium 420, and/or in the form of electronic circuitry.

At 302, the processing element 410 can execute log event instructions 422 to receive a log event for a computing device. The log event can be one of a number of log events that can be received. A number of the log events can be processed using the same approach as described in method 300. In some examples, an application programming interface can be used to provide the log events to the processing element 410. In one example, the processing element 410, can have access to a storage (e.g., a buffer) of events waiting to be processed. The storage can be populated via physical or logical devices that also have access to the storage (e.g., via an API). As noted above, a BMC can be capable to execute while the computing device it is installed within is powered to an auxiliary state and may work even if the computing device is not functioning property (e.g., if an FRU is not working).

At 304, the processing element 410 can execute model processing instructions 424 to process the log event according to a deep learning model including parameters that are trained to identify relevance of log event information to diagnose root cause errors associated with the computing device.

At 306, during the processing of the log event, the processing element 410 can determine whether to store the log event in a buffer included in a non-volatile memory of the computing device based on the relevance of the log event to diagnosis of root cause errors. As noted above, the buffer can include multiple entries. In one example, if the log event meets a threshold relevance and there is an open space in the buffer, then it is determined to be included into the buffer. Thus, the determination for storing the log event in the buffer can be based on whether there is a free entry in the buffer or the number of free entries.

In another example, as described above, the model processing instructions 424 can be executed to determine a first one of the entries in the buffer to overwrite with the log event based on a score associated with the log event and a score associated with the entry. As noted above, each of the entries in the buffer and the log event can be scored to generate score information. The log entry with the least relevant score can be selected to be replaced by the log event.

At 308, buffer instructions 426 can be executed to cause storage of the log event as one of the entries in the buffer. This can include, for example, writing to an empty space or to overwrite another entry in the buffer.

As noted above, parameters can be updated at another computing platform and received. In one example, the updated parameters for the deep learning model are received. The parameters can include updated parameters from on older version being implemented at the BMC 400. The updated parameters can be based on feedback from at least one other computing device. As noted above, the other computing device may be a test device or one implemented in the field and providing error feedback to the platform that determines the updated parameters. The other computing device may be of a same model as the computing device. As noted above, the determining whether the computing device is the same model may be based on a particular system board or other component. Devices of the same model may include different FRUs.

Processing element 410 may be, one or processing unit, one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, or combinations thereof. Processing element 410 may fetch, decode, and execute instructions 422, 424, 426. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for implementing method 300.

Although execution of method 300 is described below with reference to computing device 400, other suitable components for execution of method 300 can be utilized (e.g., computing device 102). Additionally, the components for executing the method 300 may be spread among multiple devices. Method 300 may be implemented in the form of executable instructions stored on a machine-readable storage medium, such as storage medium 120, and/or in the form of electronic circuitry.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
   a non-volatile memory including a buffer;
   a deep learning model including parameters that are trained to identify relevance of log event information to diagnose root cause errors associated with the computing device;
   a processing element to execute machine-readable instructions to:
   receive updated parameters for the deep learning model that include the parameters, wherein the updated parameters are based on feedback from another computing device, wherein the other computing device is of a same model as the computing device;
   receive a plurality of log event information;
   process, in runtime, the log event information according to the deep learning model to determine, for each respective log event information, whether to store the respective log event information in the buffer based on relevance of the respective log event information to diagnosis of root cause errors,
   wherein the log event information at compile time is associated with a different priority and is determined to be stored based on the processing of the log event information according to the deep learning model in runtime.

2. The computing device of claim 1, wherein the determination to store each respective log event information is further based on a number of free entries in the buffer.

3. The computing device of claim 1, wherein the buffer includes a plurality of entries, wherein the processing element is further to cause the device to:
   determine a first one of the entries in the buffer to overwrite with a first one of the log event information based on a score of the first one log event information and score information associated with the entries stored in the buffer.

4. The computing device of claim 3, wherein the first one entry has a least relevant score compared to the score information associated with the other entries stored in the buffer.

5. The computing device of claim 4, wherein the processing element is further to:
   overwrite the first one entry with the first one log event information.

6. The computing device of claim 1, wherein the processing element includes a baseboard management controller that is capable of execution while the computing device is powered to an auxiliary state.

7. The computing device of claim 1, wherein the updated parameters are further based on feedback by another computing device of a different model as the computing device.

8. A method comprising:
receiving, at a processing element, a log event for a computing device;
processing, via the processing element, the log event according to a deep learning model including parameters that are trained to identify relevance of log event information to diagnose root cause errors associated with the computing device;
receiving updated parameters for the deep learning model, wherein the parameters include the updated parameters, and wherein the updated parameters are based on feedback from at least one other computing device, wherein a first device of the at least one other computing device is of a same model as the computing device;
determining, by the processing element, during the processing of the log event, to store the log event in a buffer included in a non-volatile memory of the computing device based on relevance of the log event to diagnosis of root cause errors, wherein the log event, at a compile time, is associated with a lower priority, and is determined to be stored based on the processing of the log event according to the deep learning model at a higher priority,
wherein the buffer includes a plurality of entries, and storing the log event as one of the entries.

9. The method of claim 8, further comprising:
determining a first one of the entries in the buffer to overwrite with the log event based on a score associated with the log event and a second score associated with the first one entry.

10. The method of claim 9, wherein the first one entry has a least relevant score compared to score information associated with the other entries stored in the buffer.

11. The method of claim 8, wherein the processing element includes a baseboard management controller that is capable of execution while the computing device is powered to an auxiliary state.

12. The method of claim 8, wherein a second device of the at least one other computing device is of a different model as the computing device.

13. A non-transitory machine-readable storage medium storing instructions that, if executed by a physical baseboard management controller processing element of a computing device, cause the computing device to:
receive an log event for the device;
process the log event according to a deep learning model including parameters that are trained to identify relevance of log event information to diagnose root cause errors associated with the device;
receive updated parameters for the deep learning model that include the parameters, wherein the updated parameters are based on feedback from another computing device, wherein the other computing device is of a same model as the computing device;
determine, during the processing of the log event, to store the log event in a buffer included in a non-volatile memory of the device that is associated with the baseboard management controller,
wherein the determination is based on relevance of the log event to diagnosis of root cause errors, wherein the log event, at compile time, is associated with a different priority and is determined to be stored based on the processing of the log event according to the deep learning model at runtime,
wherein the buffer includes a plurality of entries,
determine a first one of the entries in the buffer to overwrite with the log event based on a score associated with the log event and a second score associated with the first one entry.

14. The non-transitory machine-readable storage medium of claim 13, wherein the first one entry has a least relevant score compared to score information associated with the other entries stored in the buffer.

15. The non-transitory machine-readable storage medium of claim 13, wherein the updated parameters are further based on feedback by another computing device of a different model as the computing device.

* * * * *